Nov. 27, 1923.
E. M. BLAKE
1,475,338
CONDUIT FASTENER FOR OUTLET BOXES
Filed Feb. 23, 1921
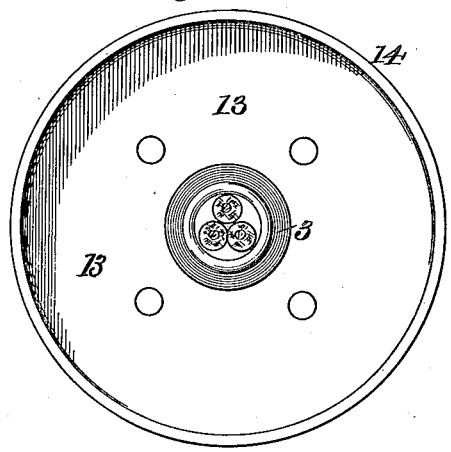
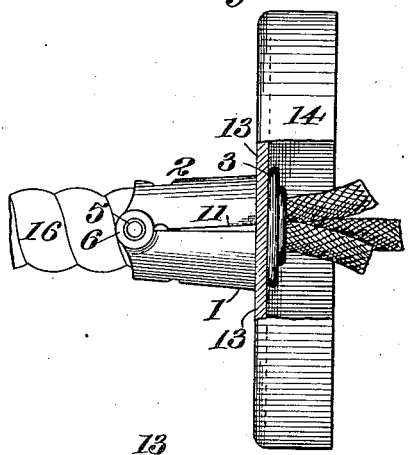
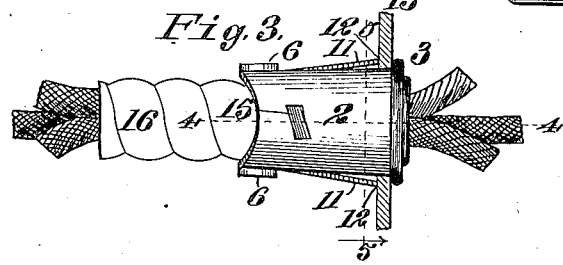
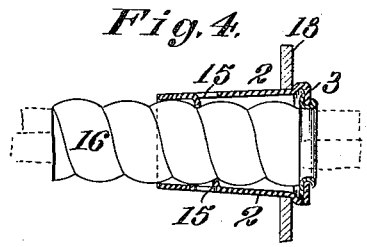
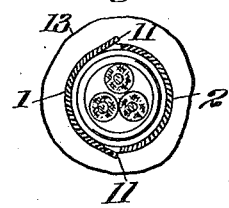
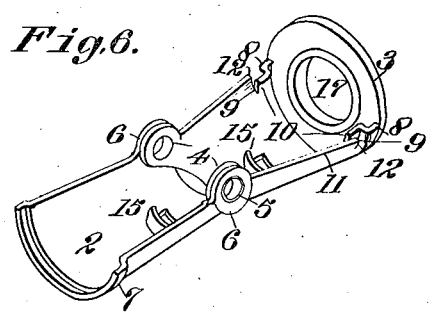

Patented Nov. 27, 1923.

1,475,338

UNITED STATES PATENT OFFICE.

EDWARD M. BLAKE, OF SAN FRANCISCO, CALIFORNIA, ASSIGNOR TO KARL BRUCH-SALER, OF SAN FRANCISCO, CALIFORNIA.

CONDUIT FASTENER FOR OUTLET BOXES.

Application filed February 23, 1921. Serial No. 447,305.

*To all whom it may concern:*

Be it known that I, EDWARD M. BLAKE, a citizen of the United States, residing at the city and county of San Francisco and State of California, have invented certain new and useful Improvements in Conduit Fasteners for Outlet Boxes, of which the following is a specification.

The hereinafter described invention relates to an attaching or fastening device for detachably securing an armored electrical conduit to outlet boxes designed for use in connection with the electrical installation of buildings generally, so as to prevent the displacement of the conduit after having been applied and properly positioned relative to the said boxes.

The object of the invention is to provide a simple, efficient and inexpensive fastener for detachably holding the conduit securely positioned within the inlet opening of the outlet box, and one of such construction as to exert a firmer securing union relative to the conduit on an outward pulling strain being exerted thereon to withdraw the conduit.

To comprehend the invention reference should be had to the accompanying sheet of drawings, wherein—

Figure 1 is a front elevation of an ordinary outlet box with the armored conduit attached thereto.

Figure 2 is a broken part sectional side elevation of the outlet box disclosing the fastener positioned and the conduit clamped therein.

Figure 3 is a side view in elevation of the fastener positioned within the outlet box, disclosing the conduit in clamped position.

Figure 4 is a longitudinal sectional view taken on the line 4—4 Fig. 3 of the drawings.

Figure 5 is a vertical sectional view taken on the line 5—5 Fig. 3 of the drawings and viewed in the direction of the arrow.

Figure 6 is a perspective view of the fastener in full open position.

The fastener comprises two semi-cylindrical tapered hinged members 1—2, the member 1 of which terminates at one end in a right angular disposed collar 3, which serves as a bushing. At its opposite end the member 1 is formed with two projecting ears 4, provided each with a laterally extended trunnion 5 adapted to project through an opening formed in corresponding ears 6 projected from the smaller end portion of the member 2. The member 2 is hinged to the member 1 by upsetting the projecting ends of the trunnions 5 of the said member 1. At its enlarged end the member 2 is slightly offset to provide a reinforcing rib or shoulder 7 and such end of the member 1 adjacent the collar 3 is similarly offset to provide a corresponding reinforcing securing rib or shoulder 8, and in order to provide for the requisite spring to the member 1 the same is cut away adjacent the face plate 3 as shown at 9, Fig. 6 of the drawings.

Adjacent its forward edges the member 1 is cut away and inwardly depressed as at 10, and as the side edges 11 of said member are raised slightly above the side edge of the member 2, due to the taper thereof being greater than that of said member 2, there is formed by such depressed portions 10 of the member 1 abutting shoulders 12 spaced a short distance back of the ribs or shoulders 7—8 of the members 1—2, the distance of separation being equal to the thickness of the back plate 13 of the outlet box 14, Figs. 2, 3, and 4 of the drawings.

Each clamp member 1—2 adjacent the hinged end thereof is stamped to provide an inwardly projected lug or tooth 15, which lugs or teeth are adapted to engage the spiral groove of the metallic covering of the armored conduit 16, Fig. 4 of the drawings, and to bite therein when the hinged members 1—2 are firmly pressed together, thereby holding the conduit in locked position against being withdrawn from within the outlet box.

The member 1 with its angular extended collar 3 is preferably stamped from a single piece of resilient sheet metal and equally so the member 2 is stamped from a single piece of sheet metal, each being suitably shaped so that when hinged one to the other and in closed position there is formed a tapered or conical shaped tubular fastener for embracing the armored conduit 16.

In attaching the conduit projected through the conduit opening in the back plate 13 of the outlet box, the fastening attachment is first fitted over the conduit a suitable distance from the end thereof by passing the conduit through the smaller open end of the fastener and through the central opening 17 of the bushing collar 3 so as to project a distance beyond the same, and the hinged clamp members 1 and 2 closed to place the inwardly projected lugs or teeth 15 thereof into engagement with the spiral groove of the armored covering of the conduit. The reduced end of the fastener is then inserted and forced through the conduit opening of the back plate 13 from the inside of the outlet box until the shoulders 12 of the member 1 are carried beyond the outer face of said plate, during which movement the members 1 and 2 are gradually compressed to securely clamp and hold the conduit against movement. As the shoulders 12 are carried beyond the inner edge of the conduit opening of the back plate 13 of the outlet box 14, the depressed side edges 11 of the member 1 spring outwardly to place the shoulder 12 of said members in engagement with the wall of the outlet box surrounding the conduit opening, so that the metal surrounding the opening of said plate of the outlet box will lie between the flanges 12 and the re-inforcing flanges 7—8 of the clamp members 1—2. These flanges engaging the inner face of the back wall of the outlet box prevent the sectional fastener being forced inwardly or through the conduit opening in the rear wall of the outlet box, while the shoulders 12 engaging with the rear face of the back plate 13 prevent the withdrawal of the fastener until the members have been compressed to permit the raised edges 11 of the member 1 passing through said opening. It will thus be noted that after the fastener has been forced through the opening of the back plate 13 of the outlet box until its collar 3 engages with the inner face of said wall, the fastener with the conduit clamped therein cannot be withdrawn from the outlet box unless the hinged clamped members be compressed to place the engaging shoulders 12 of the member 1 below the edge of the opening in the back plate 13. As the fastener is formed of a gradual taper increasing outwardly toward the end carrying the collar 3 and of a diameter slightly greater than that of the opening in the back plate 13 of the outlet box 14, it is apparent that the hinged members of the fastener are gradually compressed as the said fastener is forced into the opening of the back plate 13 from the inside of the outlet box.

The raised side edges 11 of the member 1 may be considered as spring tongues, inasmuch as the same are compressed during the inward movement of the fastener within the conduit opening of the rear wall of the outlet box until the shoulders 12 clear the edge thereof and then automatically spring outwardly to place the shoulders 12 beyond the sphere of said opening, so that the shoulders 12 and the ribs 7 and 8 of the clamp members serve as limiting stops for the fastener.

While the fastener has been described and illustrated in its preferred embodiment, I do not wish to be understood as limiting or confining the invention to the details of construction shown, for I am aware that the fastener may be constructed in the form of a tapered shell provided interiorly with teeth to engage with the spiral of an armored conduit, and with outwardly projected spring tongues and further provided at its larger end with outwardly projected spaced limiting stops adapted to engage the inner and outer faces of the back plate of an outlet box when inserted within the conduit opening thereof in order to hold the fastener in position against movement.

Having thus described the invention what is claimed as new and desired to be protected by Letters Patent is:—

1. A fastener for uniting armored conduits to outlet boxes, the same comprising two semi-circular members each free at one end and hinged together at their opposite ends, each provided with an inwardly projected tooth to engage with the spiral groove of the covering of a conduit fitted within the fastener, an outwardly projected flange on each member adjacent the free end thereof, an angularly disposed collar carried by the free end of one of the hinged members, and shoulders outwardly projected from one member a slight distance removed from its outwardly projected flange, said shoulders and the flanges of the hinged members serving as stops for engaging the rear and front wall surfaces respectively of the back plate of an outlet box when forced into the conduit opening thereof.

2. A fastener for uniting armored conduits to outlet boxes, the same comprising semi-circular members hinged together at one end, means associated with said members for engaging the spiral groove of the covering of a conduit within the fastener when the free ends of said members are brought together to form a tubular structure, means at the other end of said members for engaging the front wall surface of an outlet box plate and spring means associated with said members in spaced relation to said first mentioned means for engaging the rear wall surface of the plate of an outlet box when said fastener is forced into the conduit opening thereof.

In testimony whereof I have signed my name to this specification.

EDWARD M. BLAKE.